United States Patent [19]

Stemmler et al.

[11] 3,949,097

[45] Apr. 6, 1976

[54] PROCESS AND APPARATUS FOR COATING FOOD ARTICLES

[76] Inventors: Mathias Stemmler; Heinz Stemmler, both of Konrad Adenauer Ufer 35, Cologne, Germany

[22] Filed: Mar. 11, 1974

[21] Appl. No.: 450,253

[30] Foreign Application Priority Data

Aug. 25, 1973 Germany............................ 2342985

[52] U.S. Cl. ................. 426/310; 426/302; 426/332
[51] Int. Cl.² .......................................... A23B 4/10
[58] Field of Search ........... 426/302, 310, 465, 322, 426/323, 331, 332, 438; 117/102 A; 427/345

[56] References Cited
UNITED STATES PATENTS

| | | | |
|---|---|---|---|
| 2,415,995 | 2/1947 | Derby............................. | 426/302 X |
| 3,112,220 | 11/1963 | Heiser et al..................... | 426/302 X |
| 3,427,951 | 2/1969 | Mitan et al. ....................... | 426/302 |
| 3,533,806 | 10/1970 | Papworth et al..................... | 426/331 |
| 3,640,759 | 2/1972 | Primus et al................ | 117/102 A X |
| 3,649,290 | 3/1972 | Angold ............................ | 426/438 X |
| 3,733,216 | 5/1973 | Goldman et al. ........... | 117/102 A X |
| 3,746,570 | 7/1973 | McIntosh........................ | 117/102 A |
| 3,836,387 | 9/1974 | Roblin et al. ..................... | 117/102 A |
| 3,851,077 | 11/1974 | Stemmler et al................ | 426/302 X |

OTHER PUBLICATIONS

"Meat"; Aug. 1965; A New Type of Sausage Casing.

*Primary Examiner*—S. Leon Bashore
*Assistant Examiner*—Kenneth M. Schor
*Attorney, Agent, or Firm*—Burgess, Dinklage & Sprung

[57] ABSTRACT

In the coating of food wherein a food article is immersed in a tank containing a solution of a coating agent in a solvent, removed from the solution, allowed to drain, and removed from the tank, the improvement which comprises removing the solution from the tank while leaving the food article therein, maintaining a substantially liquid-free solvent vapor-laden atmosphere within said tank containing said coated food article while said food article drains, drawing off solvent vapors from said tank and thereafter removing said coated article from said tank, draining of said article in said solvent vapor-laden atmosphere within said tank resulting in formation of a level coating prior to setting of said coating upon removal of the solvent therefrom. The food article may be subjected to a flow of warm air prior to coating so as to remove moisture therefrom and permit better adhesion of the coating. To carry out the process there is provided an apparatus comprising a working tank, a sealable cover therefor, a tank for storage of coating solution, a pipe connecting said working tank with said storage tank, a reversible pump for pumping solution in either direction between said working tank and said storage tank through said pipe, a pair of pipes connected with said working tank, and means for introducing gas through one of said pair of pipes and for removing gas through the other of said pair of pipes, whereby volatile liquids and gases within said working tank may be removed therefrom.

5 Claims, 3 Drawing Figures

PROCESS AND APPARATUS FOR COATING FOOD ARTICLES

The invention relates to a process for coating food articles such as sausages and meats with a coating agent dissolved in a solvent. The invention also relates to an apparatus for carrying out this process.

In order to improve the keeping quality of sausages and meats, these are coated with specific coating agents dissolved in a solvent. In theory there are several possible methods of applying the coating to the articles. The coating agent can be painted on, sprayed on or applied by immersion in a tank filled with the dissolved coating agents. The first two possibilities are merely of theoretical significance, entailing too much labor. The immersion of a pole hung with sausages, hams and meats is also accompanied by drawbacks, one of which resides in the emission of a large quantity of solvent vapor which fills the whole room in which the tank is located. The operator concerned with immersing and removing the articles therefore inhales the vapor in quantities inadmissible both on health grounds and also in accordance with industrial law, and therefore he can carry out this work only for short intervals of time. Moreover when a pole hung, for example, with sausages is raised out of the tank, the solvent continues to evaporate from the coating on the sausages. The excess solvent continues to drip from the sausages. This not only leads to an initially increased weight of the pole on which the sausages are hung, but also to a further accumulation of solvent vapor and even small drops of solvent in the atmosphere. After a short period of time dizziness results. In addition to these difficulties for the operator, residues from drips and streaks form on the lower ends of the articles while the agent is dripping from them, and these must later be removed. If the articles are raised slowly from the coating and solvent agent in the tank, there arises the further disadvantage of uneven coating. The upper ends of the articles are removed from the coating agent earlier than are the lower ends and fluctuating thickness of coating thus results.

It is accordingly an object of the invention to provide a process and apparatus for the coating of foods evenly in large volumes per time unit without health hazard to the operator.

These and other objects and advantages are realized in accordance with the invention which involves an improvement in the basic process wherein a food article is immersed in a tank containing a solution of a coating agent in a solvent, removed from the solution, allowed to drain, and removed from the tank. The improvement comprises removing the solution from the tank while leaving the food article therein, maintaining a substantially liquid-free solvent vapor-laden atmosphere within said tank containing said coated food article while said food article drains, drawing off solvent vapors from said tank and thereafter removing said coated article from said tank, draining of said article in said solvent vapor-laden atmosphere within said tank resulting in formation of a level coating prior to setting of said coating upon removal of the solvent therefrom.

Certain types of sausages and meats have a relatively moist surface. In accordance with a further embodiment of the invention such sausages or meats are first blown with air warmed to approximately 40° to 50°C, over a period of time of approximately 3 - 4 minutes, and thus dried. Consequently a better adhesion of the coating is obtained.

It is generally advisable, after the article has been blown with warm air for three to four minutes, to moisten it briefly — in the region of a few seconds — with the solvent containing the coating agent, then to leave it for approximately 10 minutes in the dry atmosphere filled with solvent vapors, and finally to blow it for about five to six minutes with dry air at room temperature.

In order to carry out the process of the invention for coating the sausages and meats there is provided a storage tank for the coating agent and this is connected by way of a pipe with a working tank and an aerating and de-aerating system joined to the cover of the working tank. Thus an article is hung up in the empty working tank and this can only be filled when connected by way of a reversible pump from the storage tank. In the course of this flow the solvent rises up to the sausages and meats. The highest level is maintained for a short time and during this time the article is completely moistened. Thereupon the pump is reversed and draws the solvent back into the storage tank. The articles drip in the closed working tank filled with solvent vapors. After a drip period of approximately ten minutes in the course of which the pump remains switched on, the aerating and de-aerating system of the working tank is switched on for approximately 5 to 6 minutes. In this time the coatings dry, solidify and the solvent vapors are blown away.

As explained already, certain sausages and meats must be dried before being moistened. To this end the invention in one embodiment provides for an adjustable warm air blower to be connected to a section of the cover by way of an aeration pipe and for a de-aeration pipe to be connected to another section of the cover of the working tank. With the adjustable warm air blower the article can therefore be blown both with cold air, as for example after being coated with solvent, and also with warm air in order to dry it before the coating process. The warm air or cold air blown in through the aeration pipe is continually channelled off by means of the de-aeration pipe, so that the working tank constantly retains the desired atmospheric composition. In order to facilitate the flow of the solvent out of the working tank, its base slopes down to the center and the pipe leading to the storage tank is connected at the base's lowest point. Inside the working tank, beneath its upper edge and on two facing walls desirably there are provided ledges having recesses to receive the ends of the poles on which the articles to be coated are strung. With regard to the storage tank, in a further embodiment of the invention provision is made for a de-aeration pipe with a closure flap to be joined to the cover of this tank and for the end of the reversible pump adjoining the tank to be connected with a point on the base of the storage tank and by way of a stand pipe also with the cover. Thus if the gas pressure in the space above the liquid surface is too high it will vent to the atmosphere through the one-way closure flap. The storage tank is filled from above by way of the stand pipe with the solvent which is piped back from the working tank. In this way a continual circulation is established in the tank and the solvent contained in the tank is constantly mixed, retaining an even overall composition.

A sieve is supplied in the stand pipe to the tank cover or under the inflow of the stand pipe to filter out pieces of sausage or meat and other foreign bodies.

To refill the storage tank the cover thereof has a pipe connection linked with a container.

In order to control the flow to or from the storage tank one valve, which can either be controlled manually or electrically remote-controlled, is supplied in the pipe between the reversible pump and the working tank and another in the stand pipe leading to the cover of the storage tank.

In the pipe which leads directly from the reversible pump to the storage tank there is located a check valve. This check valve permits a flow out of the storage tank only in the direction of the pump and working tank.

Possibly a single storage tank may supply two or more working tanks connected with the storage tank by way of a reversible pump and the necessary valves. Then, for example, while one working tank is being filled with articles or coated articles are being removed from the tank, a second working tank can be filled with solvent, blown with air, etc. Particularly in the case of a system with two or more working tanks it is advisable to supply an electrical time control device for switching on and turning off the blower, the reversible pump and for switching the valve in accordance with a prescribed schedule.

The invention will now be described in more detail with reference to the illustrative drawings, wherein.

Figure 1:
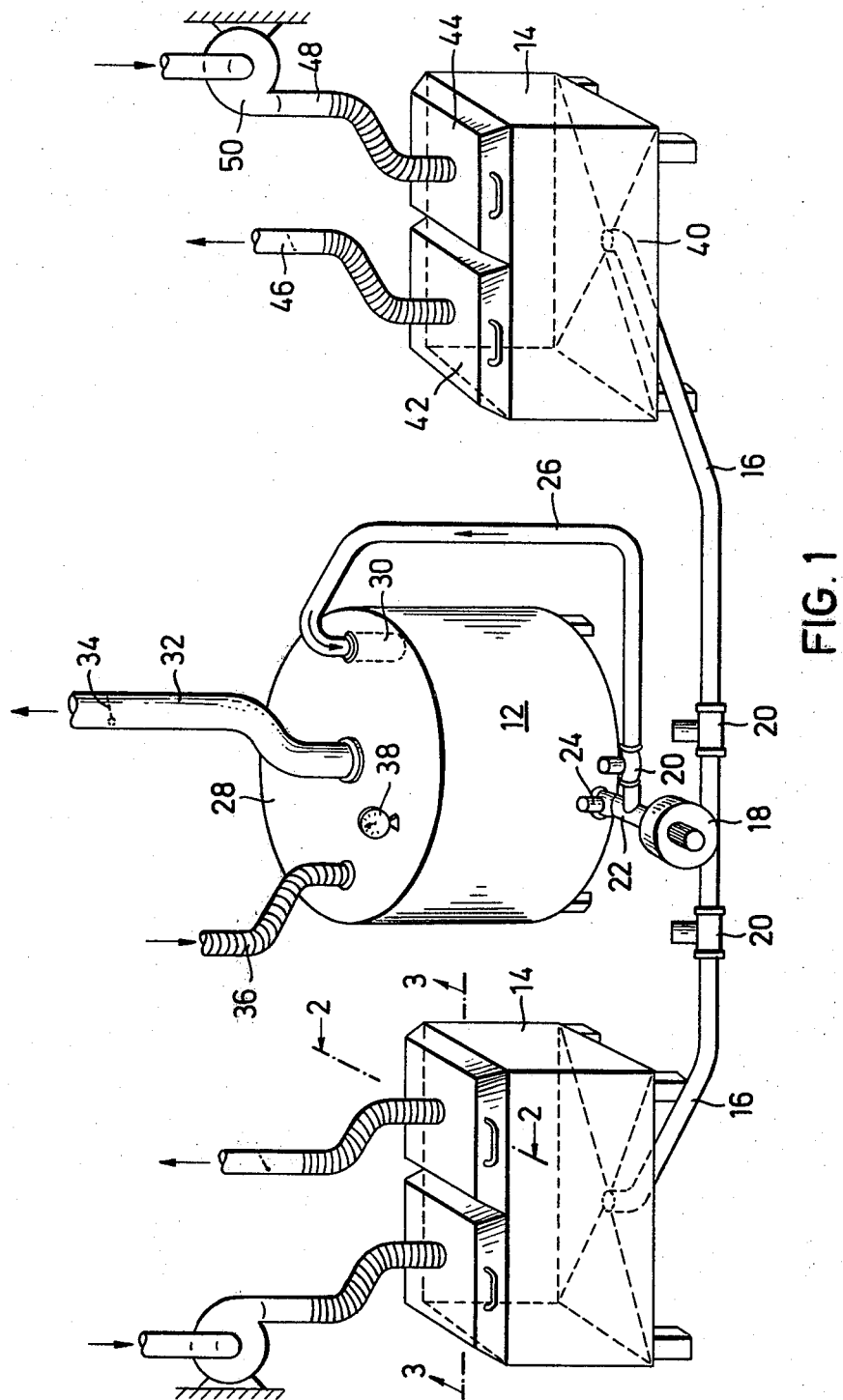
FIG. 1 is a perspective view of a complete system with a storage tank and two working tanks.

Referring now more particularly to the drawings, in FIG. 1 there is shown a storage tank 12 located between two working tanks 14. From the storage tank 12 a pipe 16 leads to each of the two working tanks 14. A reversible pump 18 is located in this pipe. In each of the two pipes 16 there is provided a controllable valve 20. A small length of piping 22 leads from the reversible pump 18 to the base of the storage tank 12. A check valve 24 is located in the length of piping 22 directly before the inflow into the storage tank 12. A stand pipe 26 leads from the reversible pump 18 to the cover 28 of the storage tank 12. A sieve 30 is positioned beneath the inflow of this stand pipe 26 into the storage tank 12. A de-aeration pipe 32, in which a flap 34 is located, leads from the cover 28 to the outside air. Another pipe connection 36 is positioned on the cover 28, and this leads into a refill container (not shown) and a liquid level gauge 38.

Figure 3:
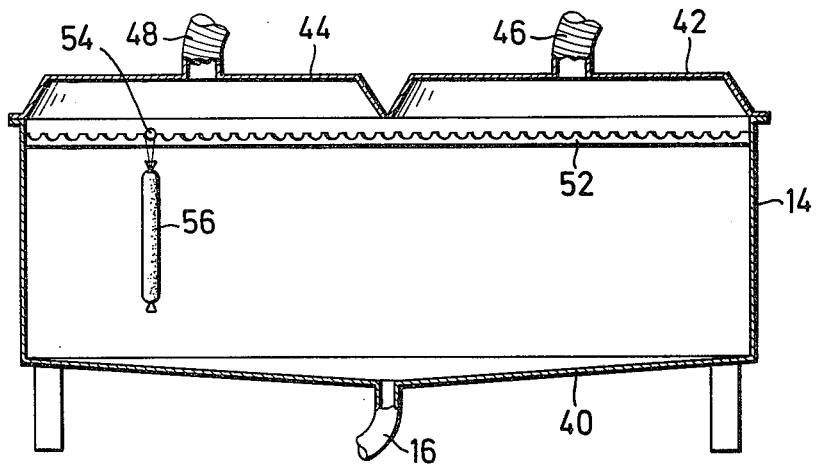
FIG. 3 is a section along line 3—3 of FIG. 1.
Figure 2:
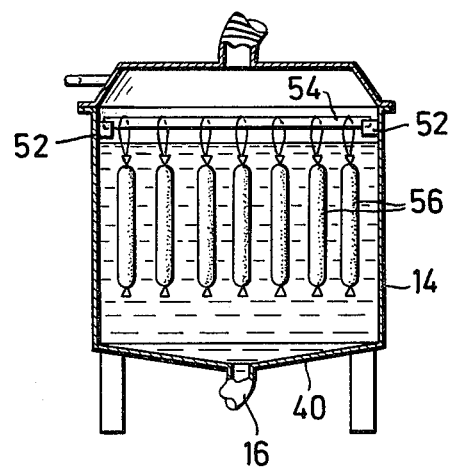
FIG. 2 is a section along line 2—2 of FIG. 1.

Turning now to FIGS. 2 and 3, the storage tanks 14 have sloping bases 40. The pipes 16 are connected to the lowest point of each base 40. Moreover each working tank 14 has a cover divided into two parts 42 and 44. A de-aerating pipe 46 which leads to the outside air is connected to the cover section 42. A further pipe 48 links the adjustable warm air blower with the cover section 44. FIGS. 2 and 3 show the ledges 52 located inside the working tank 14 and beneath its upper ledge. These ledges are scalloped to provide a plurality of recesses for receiving the ends of poles 54 which support the sausages 56.

An example of a solution which can be applied to achieve coating in accordance with the invention may comprise about 20 to 50 parts by weight of cellulose propionate with a viscosity (20% by weight solution in acetone, measured in seconds in accordance with ASTM D 871–56, formula B) of about 15 to 95 poise, about 80 to 50 parts weight of a completely acetylated distilled monoglyceride, as from lard, and an organic solvent, such as acetone, present in about 2.5 to 4.5 times the weight of the cellulose propionate. With cellulose propionate having a viscosity of about 15 to 50 poise, preferably the organic solvent is present in about 2.5 to 3.5 times its weight; with a viscosity of about 50 to 90 poise the solvent is present in about 3.5 to 4.5 times its weight.

The invention is further described in the following illustrative example using the apparatus shown in the drawings.

EXAMPLE

Phase I

A working tank 14, 2.5 m long, 1 m wide, with an immersion depth of 0.8 m and having a volume of 1.8 $m^3$, is filled with sausages 56 hung on the poles with the cover sections 42 and 44 folded up. The two cover sections are then closed. The blower 50 is switched on and adjusted to a temperature of about 40°C. After three or four minutes the blower 50 is turned off, the temperature and duration having been correlated to the moisture content of the sausages.

Phase II

The associated valve 20 is opened and the reversible pump 18 turned on, pumping liquid out of the storage tank 12 which has a volume of about 2.5 $m^3$. The working tank 14 is filled from below with the solvent containing the coating agent, viz. 35 parts by weight of cellulose propionate, 65 parts of diacetylated monoglyceride and 100 parts of acetone. The highest liquid level is maintained briefly — for approximately three seconds. In the course of this time the pump 18 is switched off and the valve 20 is closed.

Phase III

The valves 20 in the pipe 16 and the stand pipe 26 are opened. The reversible pump 18 is switched on in the opposite direction. It sucks the solvent containing the coating agent out of the working tank 14 and forces it back into the storage tank, entering from above. The check valve 24 prevents an inflow from beneath into the storage tank 12. Foreign bodies and pieces which have fallen off from the sausages or meat are retained in the sieve 30. After the working tank 14 has been emptied the pump 18 can be changed to a lower gear or be switched on and off intermittently. This state is maintained for approximately ten minutes. Excess solvent slowly runs down the sausages and drips onto the base 40. The space in the tank 14 is filled with solvent vapors, and in this atmosphere the coating agent remains soft. No ridges, drips, or streaks or the like form on the sausages. At the end of this period of time the pump 18 is switched off and the two valves 20 are closed.

Phase IV

The blower 50 is turned on for five or six minutes without its heater. The sausages are blown with air and dried. At the same time the solvent vapors are channelled off by way of the de-aeration pipe 46. At the end of this phase the blower 50 is turned off and the two cover sections 42 and 44 are opened. The coating on the sausages solidifies and they are then removed.

In the case of a system with two or more working tanks 14 these processes are series-connected or interlocked. To simplify and raise the efficiency of the system an electrical or mechanical time control device may be employed. Thus a constant level of liquid in the storage tank 12 is maintained. A viscosity gauge indicates if too much solvent evaporated so that the solution became too viscous, in which event make-up solvent is added.

It will be appreciated that the instant specification and examples are set forth by way of illustration and not limitation, and that various modifications and changes may be made without departing from the spirit and scope of the present invention.

What is claimed is:

1. In the coating of food wherein a food article is immersed in a tank containing a solution of a coating agent in a solvent, removed from the solution, allowed to drain, and removed from the tank, the improvement which comprises removing the solution from the tank while leaving the food article therein, draining the liquid from said food article and maintaining a substantially liquid free solvent vapor-laden atmosphere within said tank containing said coated food article while said food article drains, drawing off solvent vapors from said tank and thereafter removing said coated article from said tank, draining of said article in said solvent vapor-laden atmosphere within said tank resulting in formation of a level coating prior to setting of said coating upon removal of the solvent therefrom.

2. The process of claim 1, wherein the food article is first placed in said tank while empty, warm air is passed through said tank to remove moisture from said food article, and the solution of coating agent is thereafter introduced into said tank to effect immersion of said food article.

3. The process of claim 2, wherein said warm air is at a temperature of about 40° to 50°C and its passage is effected for about 3 to 4 minutes.

4. The process of claim 1, wherein the coated food article is permitted to drain in said solvent vapor-laden atmosphere for about 10 minutes, and air is thereafter passed through said tank for about 5 to 6 minutes to remove solvent from said tank and said coating.

5. The process of claim 4, wherein the food article is a sausage or meat and is first placed in said tank while empty, air at about 40° to 50°C is passed through said tank for about 3 to 4 minutes to remove moisture from said food article, and the solution of coating agent is thereafter introduced into said tank to effect immersion of said food article.

* * * * *